US009171336B2

(12) United States Patent
Englar et al.

(10) Patent No.: US 9,171,336 B2
(45) Date of Patent: Oct. 27, 2015

(54) CUMULATIVE CONNECTEDNESS

(75) Inventors: Bruce Wyatt Englar, Ventura, CA (US);
Brett A. Nielson, Spangle, WA (US);
Rangarajan Umamaheswaran, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 981 days.

(21) Appl. No.: 13/220,099

(22) Filed: Aug. 29, 2011

(65) Prior Publication Data

US 2013/0055151 A1 Feb. 28, 2013

(51) Int. Cl.
*G06F 3/048* (2013.01)
*G06Q 50/00* (2012.01)
*G06F 3/01* (2006.01)

(52) U.S. Cl.
CPC . *G06Q 50/01* (2013.01); *G06F 3/01* (2013.01)

(58) Field of Classification Search
CPC .................................. G06F 3/01; G06Q 50/01
USPC .......................................... 715/809; 709/204
See application file for complete search history.

(56) References Cited

U.S. PATENT DOCUMENTS

| | | | |
|---|---|---|---|
| 7,177,880 B2* | 2/2007 | Ruvolo et al. ......................... 1/1 |
| 7,856,411 B2* | 12/2010 | Darr ................................. 706/45 |
| 7,865,551 B2* | 1/2011 | McCuller ....................... 709/204 |
| 8,239,499 B2* | 8/2012 | Kwon ............................ 709/220 |
| 8,352,574 B2* | 1/2013 | Kwon ............................ 709/218 |
| 8,416,997 B2* | 4/2013 | Winters et al. ................. 382/118 |
| 8,560,605 B1* | 10/2013 | Gyongyi ........................ 709/204 |
| 9,026,593 B2* | 5/2015 | Park et al. ...................... 709/204 |
| 2005/0015432 A1* | 1/2005 | Cohen ............................ 709/201 |
| 2005/0216300 A1* | 9/2005 | Appelman et al. ................. 705/1 |
| 2011/0087674 A1* | 4/2011 | Schokking et al. ............ 707/748 |
| 2011/0202406 A1* | 8/2011 | Suomela .................... 705/14.52 |

* cited by examiner

*Primary Examiner* — William Bashore
*Assistant Examiner* — Gregory A Distefano
(74) *Attorney, Agent, or Firm* — Michael A. Springs; Moore & Van Allen PLLC; Anup Shrinivasan

(57) ABSTRACT

Embodiments of the invention are directed to systems, methods and computer program products for determining the connectedness from a first individual to a second individual on a social network. In some embodiments, a method includes: (a) receiving information associated with the social network, (b) determining a direct connection between the first individual and the second individual, (c) determining one or more indirect connections between a first individual and a second individual, and (d) determining the connectedness based at least partially on: the direct connection, and/or the number of indirect connections between the first individual and the second individual, and/or the type of each indirect connection, and/or a qualitative value of each indirect connection. Embodiments of the invention allow a user of a system to determine the strength (or quality/closeness) of a connection between two individuals on a social network.

27 Claims, 6 Drawing Sheets

```
600
File    Edit    Account Services    Web Services    Help

Authenticated ✓

List of Individuals connected to Name1 with connectedness value less than or equal to 'Value'
         482                         484                    486
Name    ↑↓      Connectedness Value ↑↓    Social Network ↑↓
Name29          8.62                      Social Network A
Name22          7.65                      Social Network C
Name78          6.56                      Social Network A
Name93          6.54                      Social Network B
Name91          6.43                      Social Network D
Name456         6.40                      Social Network B
Name221         6.35                      Social Network C Start
```

FIG. 6

CUMULATIVE CONNECTEDNESS

BACKGROUND

A first individual on a social network may be directly or indirectly connected to a second individual. The probability that two directly connected individuals know each other (or are well acquainted with each other) may be ambiguous. This is because although the two individuals are directly connected to each other, the direct connection may have resulted from a single meeting between the two individuals, and the two individuals may have not interacted with each other since that meeting. The probability that two indirectly connected individuals know each other (or are well acquainted with each other) may also be ambiguous for the simple reason that the two individuals are not directly connected to each other. Therefore, there is a need for a system to solve these ambiguities and determine the quality or strength, both on a quantitative and qualitative basis, of a connection between any two individuals on a social network.

BRIEF SUMMARY

Embodiments of the invention are directed to systems, methods and computer program products for determining the connectedness from a/first individual to a second individual on a social network. In some embodiments, a method includes: (a) receiving information associated with the social network, (b) determining a direct connection between the first individual and the second individual, (c) determining one or more indirect connections between a first individual and a second individual, and (d) determining the connectedness based at least partially on: the direct connection, and/or the number of indirect connections between the first individual and the second individual, and/or the type of each indirect connection, and/or the qualitative value of each indirect connection. In some embodiments, a connection is a path between the first individual and the second individual, and the path includes one or more intermediate individuals. The qualitative value of an indirect connection is based on qualitative information pulled from a social network. This qualitative information includes information that is exchanged between the individuals and/or information that is not exchanged between the individuals. In some embodiments, qualitative values may even be generated for direct connections between individuals. Embodiments of the invention allow a user of a system to determine the strength (or quality/closeness) of a connection between two individuals on a social network.

BRIEF DESCRIPTION OF THE DRAWINGS

Figure 1:
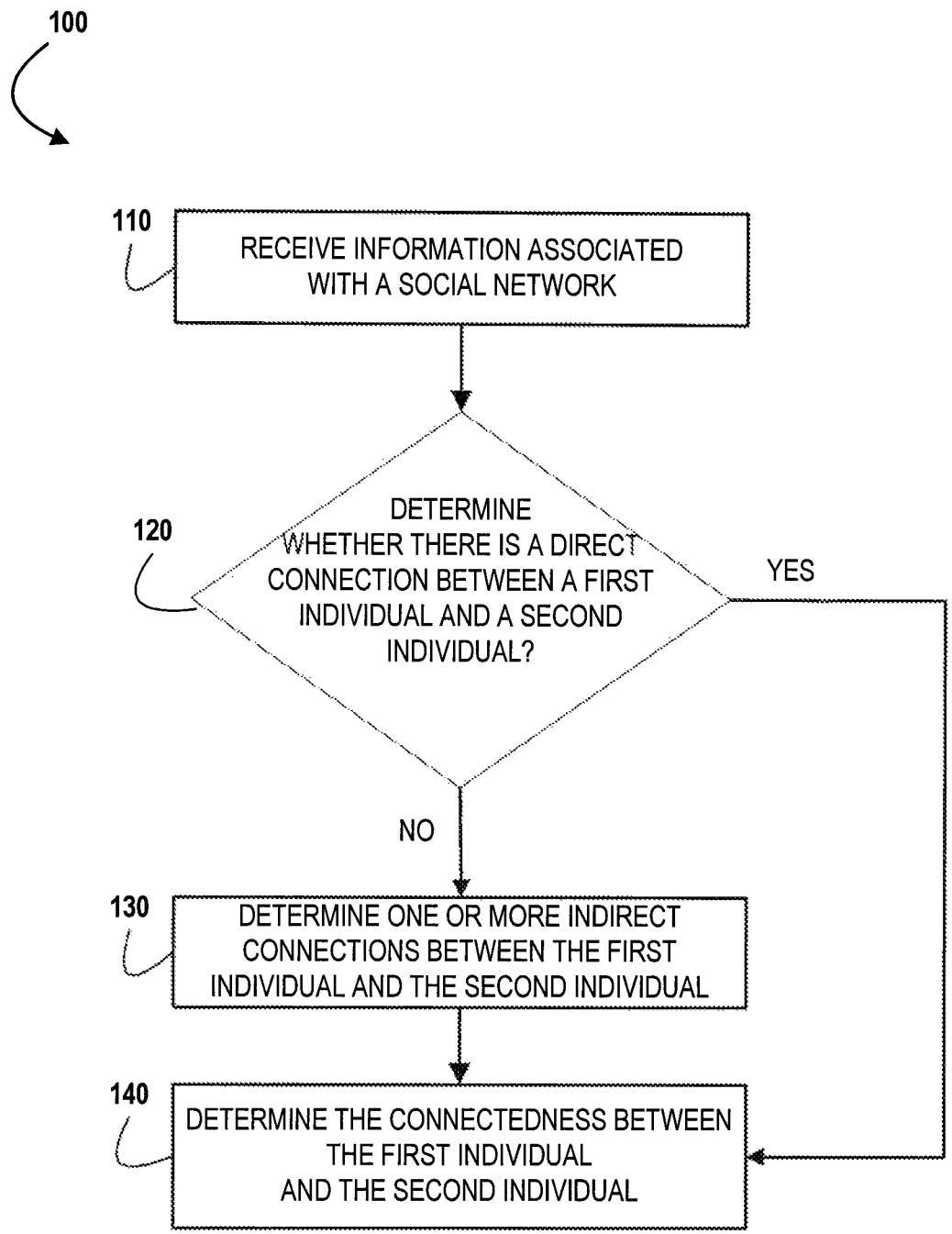
Figure 2:
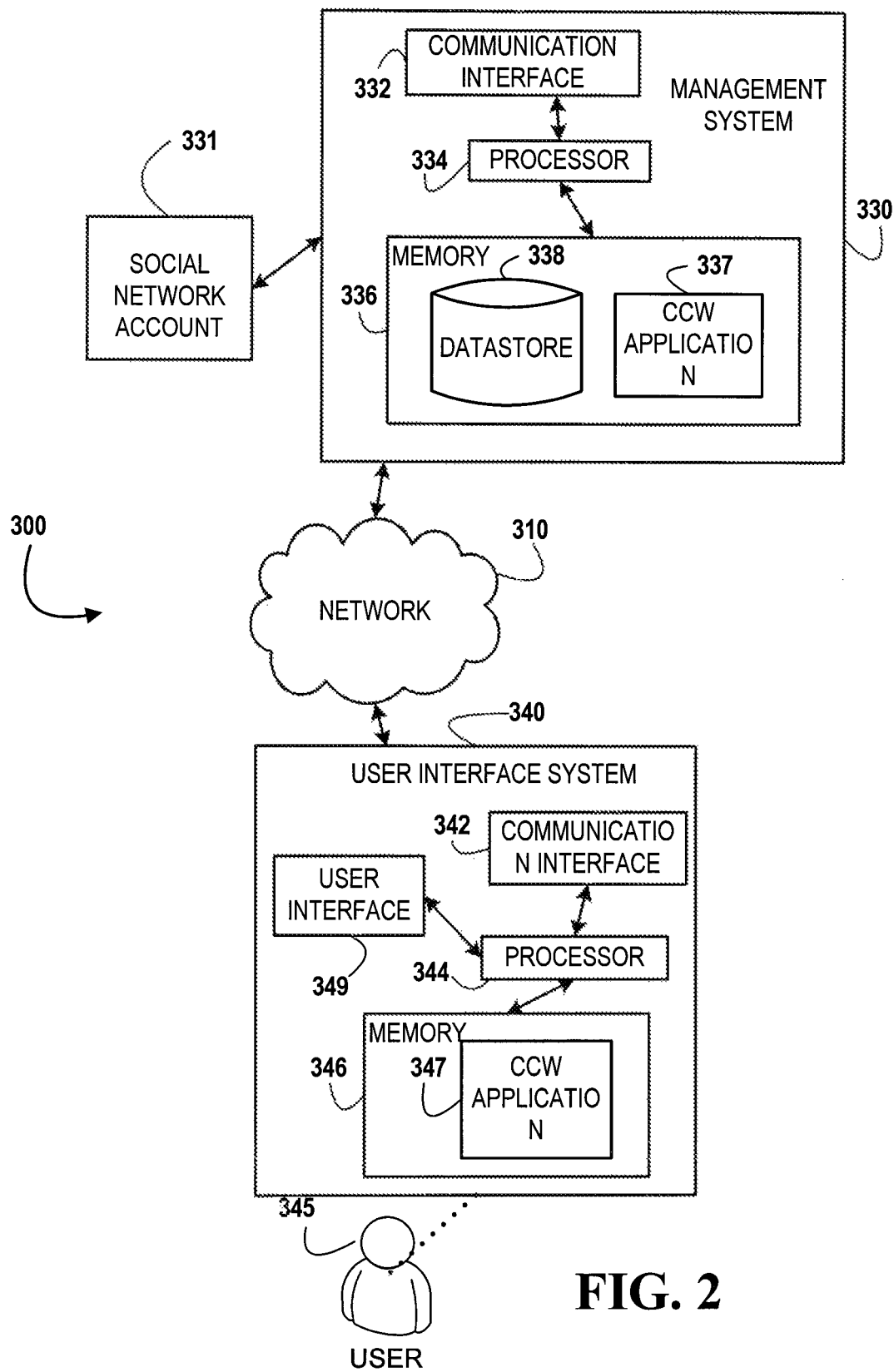
Figure 3:
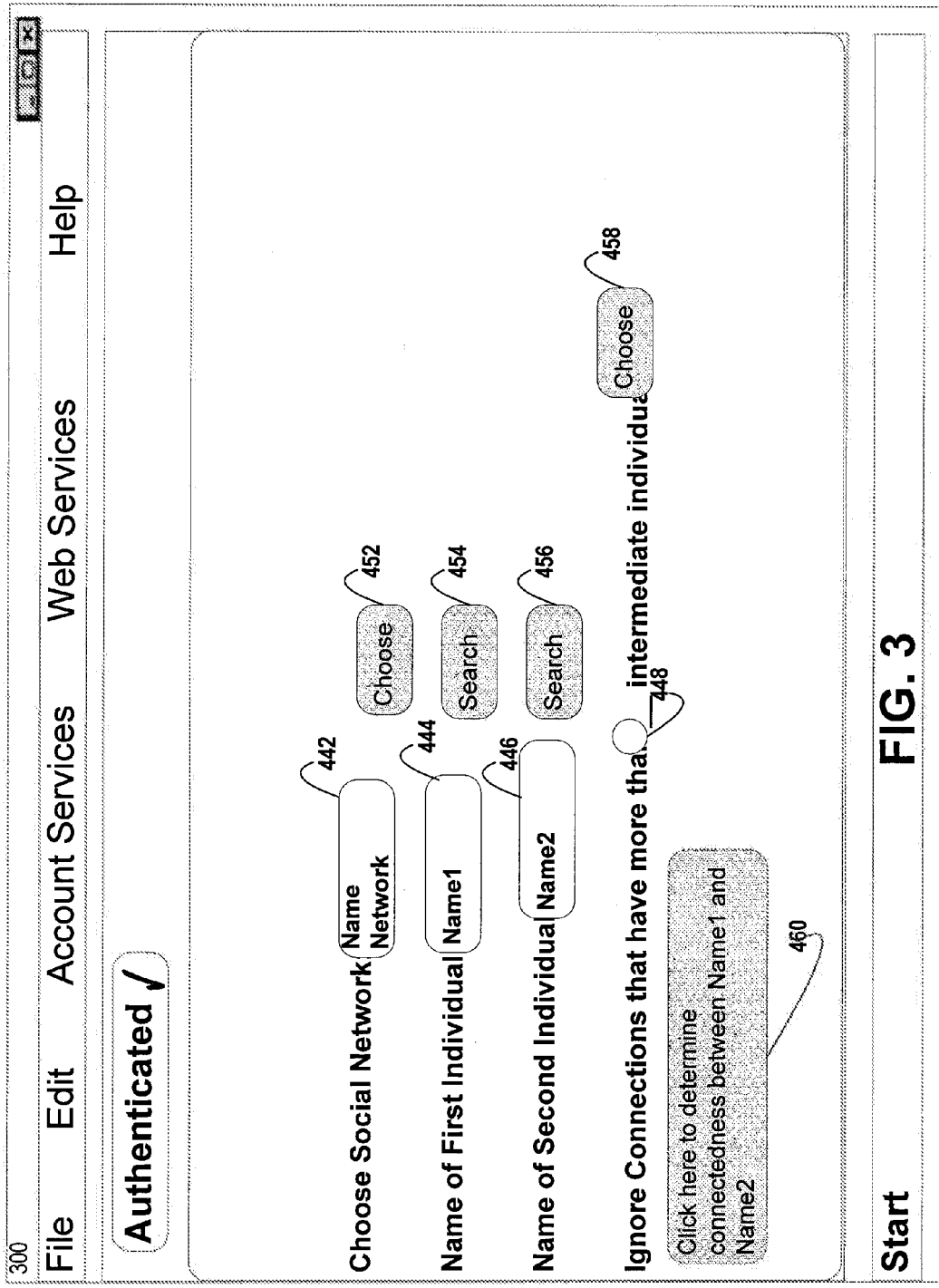
Figure 4:
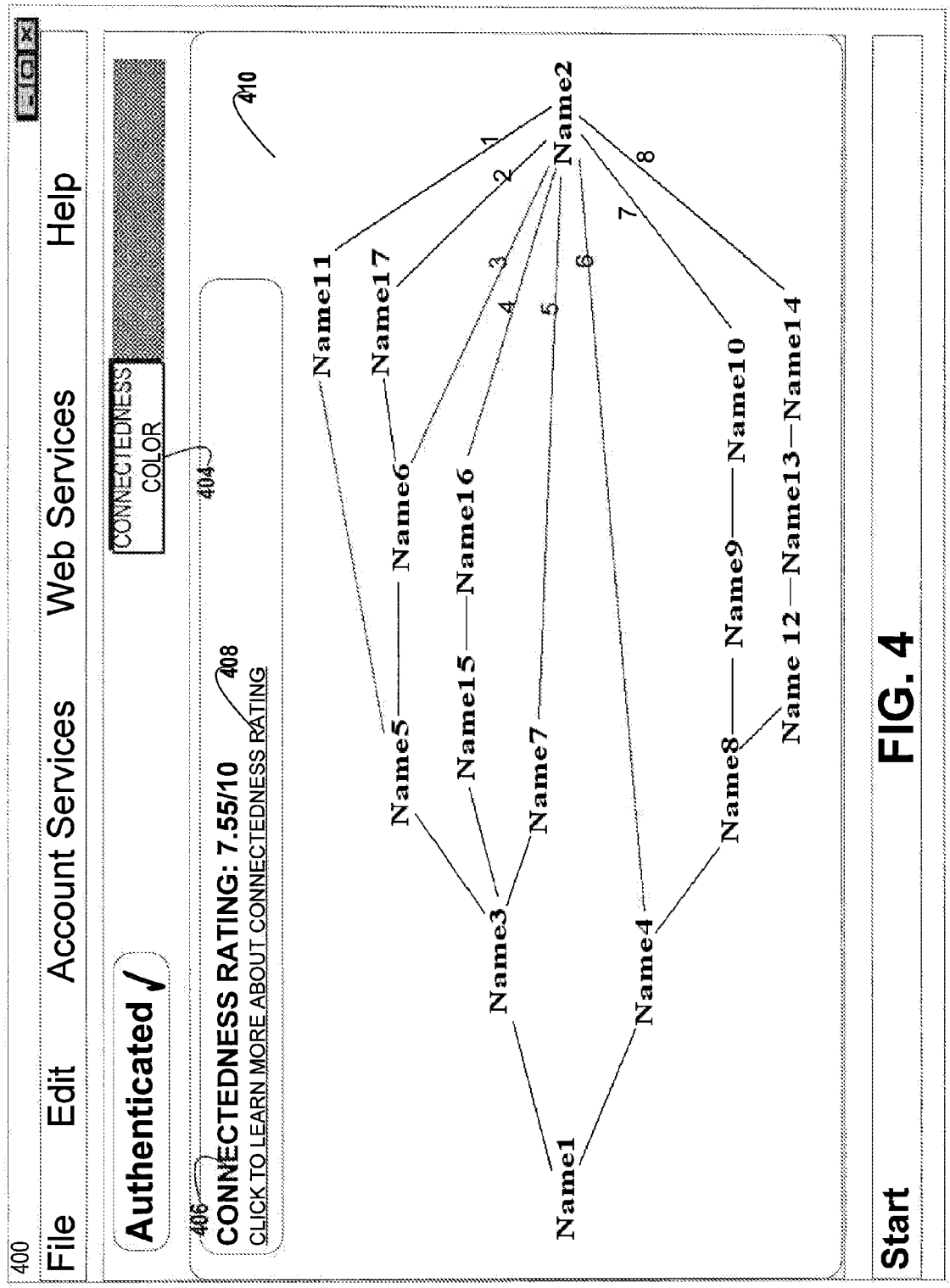
Figure 5:
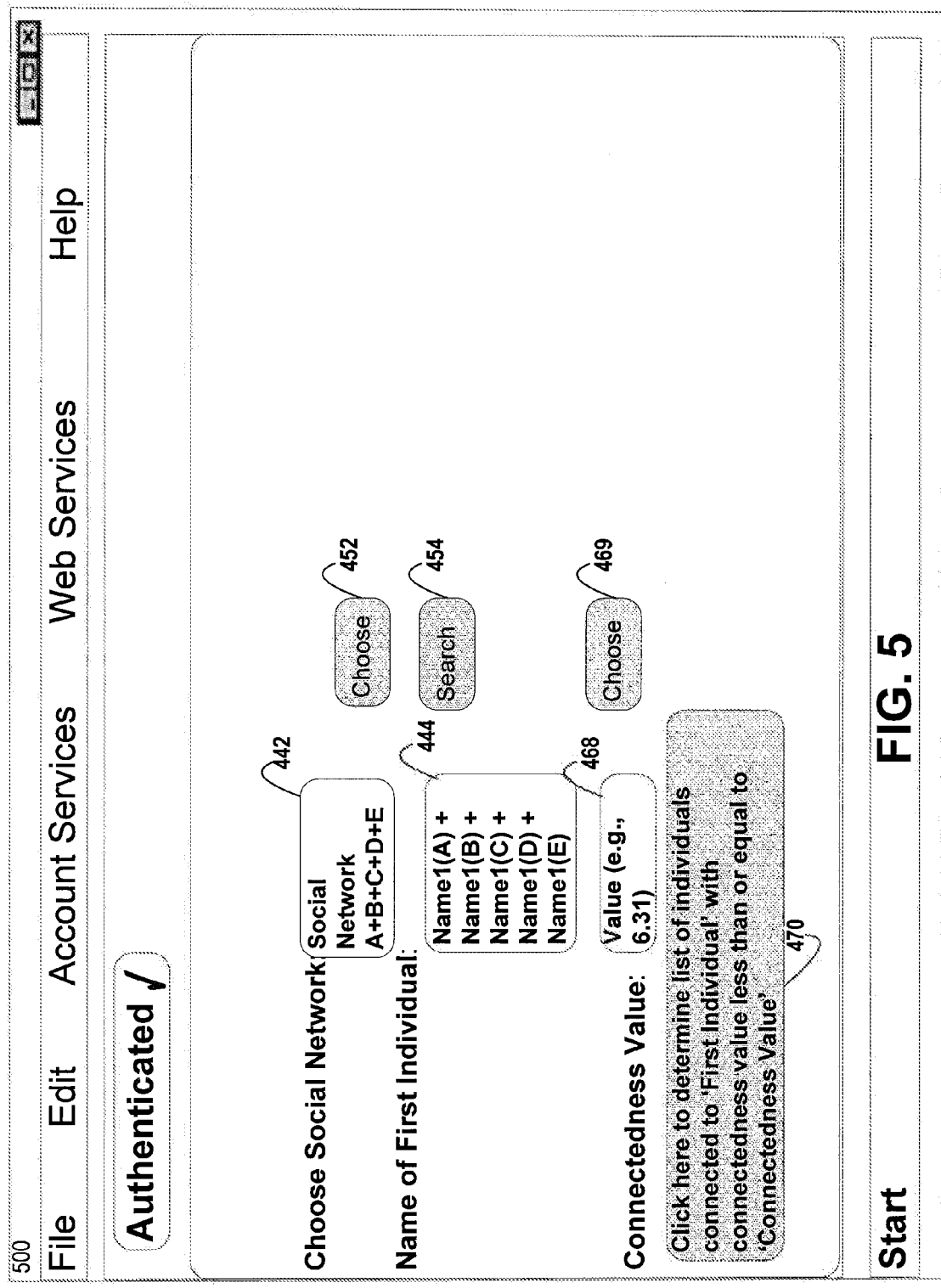

Having thus described embodiments of the invention in general terms, reference will now be made to the accompanying drawings, where:

FIG. 1 is a flowchart illustrating a general process flow for determining the connectedness from a first individual to a second individual on a social network, in accordance with embodiments of the present invention;

FIG. 2 is a block diagram illustrating technical components of a system for determining the connectedness from a first individual to a second individual on a social network, in accordance with embodiments of the present invention;

FIGS. 3-4 are illustrations of a graphical user interface initiated by a system for determining the connectedness from a first individual to a second individual on a social network, in accordance with embodiments of the present invention; and FIGS. 5-6 are illustrations of a graphical user interface initiated by a system for determining a list of individuals connected to a user-selected individual on a social network (or a plurality of social networks), where the connectedness value from the user-selected individual to a determined individual is less than or equal to a user-inputted connectedness value, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for determining the connectedness from a first individual to a second individual on a social network. As used herein, a social network is a social structure comprising nodes (i.e., individuals, entities, bots, etc.), that are connected to each other. The connection may be formed as a result of some interdependency between the individuals, such as friendship, a family relationship, a business connection, or some other shared interest, etc. In some embodiments, in order for a first individual to "connect" to a second individual on a social network, a first individual may send an invitation to the second individual, and the second individual would have to subsequently accept the invitation to establish the connection on the social network.

An apparatus may generate the "connectedness" in order to determine the strength or closeness of a connection between a first individual and a second individual on a social network. In some embodiments, the connectedness may be generated in numerical or graphical form. As used herein, connectedness may also be referred to as "cumulative connectedness," or "cumulative connectedness weight," or "CCW." In some embodiments, a method of the invention includes: (a) receiving information associated with the social network, (b) determining a direct connection between the first individual and the second individual, (c) determining one or more indirect connections between a first individual and a second individual, and (d) determining the connectedness based at least partially on: the direct connection, and/or the number of indirect connections between the first individual and the second individual, and/or the type of each indirect connection. Embodiments of the invention allow a user of a system to determine the strength (or quality/closeness) of a connection between two individuals on a social network. In some embodiments, the term "connectedness" as used herein generally refers to quantitative connectedness, i.e., connectedness calculated based on quantitative factors (e.g., the number of indirect connections between the first individual and the second individual, and/or the type of each indirect connection).

In some embodiments, the qualitative value of an indirect connection is an additional factor that is used to determine the connectedness value of an indirect connection. This qualitative value is based on qualitative information associated with the first individual and the second individual gleaned (or received/pulled) from one or more social networks or from other public information. In embodiments where the qualitative value of an indirect connection is used as an additional parameter in determining the connectedness value of an indirect connection, the connectedness may be referred to as qualitative connectedness. In some embodiments, only the qualitative value of an indirect connection may be used to determine the connectedness associated with either a direct connection or indirect connection. In such embodiments, the qualitative connectedness becomes pure qualitative connectedness.

In a commercial or financial context (or other security, forensic, or investigative contexts), the connectedness value (qualitative or quantitative connectedness) may be related to risk. For example, a high connectedness value for an indirect connection between two individuals with no obviously evident relationship might indicate an opportunity or intent to defraud a financial entity via collusion. Identifying such connections between two individuals could alert a commercial or financial entity to scrutinize carefully any financial dealings between those two individuals, thus reducing potential losses. As another instance, a financial entity may be able to exploit a high connectedness value for an indirect connection between two individuals to increase entity revenues via affinity marketing by encouraging (rewarding) referrals, or as an entry path to a desirable targeted market segment.

Referring now to FIG. 1, a general process flow 100 is provided for determining the connectedness from a first individual to a second individual on a social network, in accordance with embodiments of the present invention. In some embodiments, the process flow 100 is performed by an apparatus (e.g., management system 330 or user interface system 340 illustrated in FIG. 2, etc.) having hardware and/or software configured to perform one or more portions of the process flow 100. In such embodiments, as represented at block 110, the apparatus is configured to receive information associated with the social network. In some embodiments, the apparatus is also configured to receive, via user input, the name of the first individual on the social network and the name of the second individual on the social network. As represented at block 120, the apparatus is configured to determine whether there is a direct connection between the first individual and the second individual. As represented at block 130, the apparatus is configured to, in response to determining no direct connection between the first individual and the second individual, determine one or more indirect connections between a first individual and a second individual. As represented at block 140, the apparatus is configured to determine the connectedness between the first individual and the second individual based at least partially on: the number of indirect connections between the first individual and the second individual, and the type of each indirect connection.

At block 110, in some embodiments, the apparatus prompts a user of the apparatus to input, on a user interface, a name of a social network, a name of a first individual on the social network, and a name of a second individual on the social network. In some embodiments, the apparatus receives the name of the social network and the name of the first individual, and subsequently receives (or pulls) social network information associated with the first individual's account on the social network. The received information includes a first list of individuals directly connected to the first individual. As a further instance, the apparatus may also receive a second list of individuals, where the individuals in the second list are directly connected to the individuals in the first list of individuals. As a further instance, the apparatus may also receive a third list of individuals, where the individuals in the third list are directly connected to the individuals in the second list of individuals, and so on.

Thereafter, at block 120, in some embodiments, the apparatus may determine whether the second individual is present on the first list of individuals directly connected to the first individual. In some embodiments, as represented in FIG. 1, if the apparatus determines at block 120 that there is a direct connection between the first individual and the second individual (i.e., if the second individual is present on the first list of individuals directly connected to the first individual), the apparatus may skip block 130 and proceed directly to block 140. In some embodiments, the apparatus may assign the maximum value for the connectedness (e.g., '10') if the apparatus determines a direct connection between the first individual and the second individual.

In other embodiments, the direct connection between the first individual and the second individual may merely be a factor in determining the connectedness between the first individual and the second individual. Therefore, in such embodiments, regardless of whether there is a direct connection between the first individual and the second individual, the process flow proceeds from block 120 to block 130.

Thereafter, at block 130, the apparatus determines one or more indirect connections between the first individual and the second individual. As used herein, an "indirect connection" is a path between the first individual and the second individual, where the path includes one or more intermediate individuals. In some embodiments, the apparatus may determine all indirect connections between the first individual and the second individual, regardless of the number of intermediate individuals associated with each of the indirect connections. In some embodiments, the apparatus ignores indirect connections that have more than a particular number of intermediate individuals. In some embodiments, the apparatus prompts a user to input this "particular" number on a user interface (e.g., see FIG. 4) along with other user input related to the name of the social network and the names of the first and second individuals. As used herein, a first individual may be a particular number of degrees away from a second individual if the indirect connection between the first individual and the second individual includes 'particular number minus one' intermediate individuals.

Thereafter, at block 140, the apparatus determines the connectedness from a first individual to a second individual. In some embodiments, the apparatus may determine the connectedness using a computer-implemented mathematical function that takes into account, among other factors, the number of connections (direct and/or indirect) between the first individual and the second individual, and the type of each connection. The various factors that may be taken into account in generating the connectedness are described below with respect to image 410 in FIG. 4.

In some embodiments, the apparatus may determine the connectedness from the first individual to the second individual based on the number of connections (may include direct and/or indirect connections) between the first individual and the second individual. For instance, in the image 410 of FIG. 4, there are eight connections between Name1 (first individual) and Name2 (second individual). The eight connections are: 1) Name3-Name5-Name11, 2) Name3-Name5-Name6-Name17, 3) Name3-Name5-Name6, 4) Name3-Name15-Name16, 5) Name3-Name7, 6) Name4 7) Name4-Name8-Name9-Name10, and 8) Name4-Name8-Name12-Name13-Name14. Each of the eight connections contributes to the connectedness determined by the apparatus. However, as explained below, some of the eight connections may have a bigger contribution to the connectedness when compared to some of the other connections.

In some embodiments, the apparatus may determine the connectedness from the first individual to the second individual based on the type of each connection between the first individual and the second individual. As used herein, a "type" associated with each connection may refer to the number of intermediate individuals situated on the connection. For instance, if there is a direct connection (no intermediate individuals) between Name1 and Name2, that direct connection would have the biggest contribution to the connectedness when compared to any of the other indirect connections. As a further instance, the indirect connection no. 6 (Name4) may have a bigger contribution to the connectedness when compared to indirect connection no. 5 (Name3-Name7). As a further instance, the indirect connection no. 5 (Name3-Name7) may have a bigger contribution to the connectedness when compared to the indirect connection no. 4 (Name3-Name15-Name16).

In some embodiments, the number of intermediate individuals situated on a connection may not be linearly proportional to the contribution of the connection to the connectedness. For instance, a direct connection between Name1 and Name2 may contribute 5 points to a possible maximum of 10 points that the connectedness can take. As a further instance, the indirect connection no. 6 (Name4) may contribute 0.2 points to the connectedness. As an even further instance, the indirect connection no. 4 (Name3-Name15-Name16) may contribute 0.08 points to the connectedness. In some embodiments, the points associated with each connection are input to a computer-implemented mathematical function that generates the connectedness.

In some embodiments, the computer-implemented mathematical function is dynamically generated based at least partially on one or more elements of the received social network information associated with the first individual. For instance, if there are more than a predetermined number (e.g., 20) of second degree (i.e., one intermediate individual situated on the indirect connection) indirect connections, the mathematical function may be dynamically generated so that each indirect connection contributes 0.3 points to the connectedness (rather than 0.2 points as described in the above embodiments). Alternatively, if there are more than a predetermined number (e.g., 20) of second degree indirect connections, the mathematical function may be dynamically generated so that the 20 second degree indirect connections contribute a total of 2.5 points to the connectedness.

In some embodiments, the apparatus may determine the contribution of each indirect connection to the connectedness based at least partially on the number of branch connections that emerge from an indirect connection. For instance, the indirect connection no. 4 may have a smaller contribution to the connectedness when compared to the indirect connection no. 3 even though both indirect connections no. 4 and no. 3 have three intermediate individuals. This is because indirect connection no. 3 has two branch connections (indirection connection nos. 1 and 2) that emerge out of indirect connection no. 3, while indirect connection no. 4 does not have any branch connections that emerge out of indirect connection no. 4. Therefore, not only do indirect connection nos. 1 and 2 contribute to the connectedness on their own, but they also contribute to the connectedness as branch connections that emerge from indirect connection no. 3.

In some embodiments, the apparatus may determine the contribution of each indirect connection to the connectedness based at least partially on the type of branch connections that emerge from an indirect connection. For instance, there are two branch connections (first branch connection is indirect connection no. 1 and second branch connection is indirect connection no. 2) that emerge out of indirect connection no. 3. For this instance, the first branch connection may have a greater impact (when compared to the second branch connection) on the contribution of indirect connection no. 3 to the connectedness. This is because the first branch connection emerges out of indirect connection no. 3 at a point closer to the first individual (Name1) when compared to the second branch connection. For instance, if indirect connection no. 3 contributes 0.08 points to the connectedness, the first branch connection may contribute 0.02 points of the 0.08 points while the second branch may contribute 0.01 points of the 0.08 points.

In some embodiments, a branch connection may have a smaller impact on the contribution of an indirect connection (i.e., the trunk connection) to the connectedness if the branch connection returns to the trunk connection. For instance, assume indirect connection no. 7 contributes 0.05 points to the connectedness. In such an instance, assume branch connection (i.e., indirect connection no. 8) contributes 0.02 points of the 0.05 points that the indirect connection no. 7 contributes to the connectedness. If Name14 on indirect connection no. 8 was connected to Name10 rather than directly to Name2, then the branch connection (i.e., indirect connection no. 8) may contribute only 0.01 points of the 0.05 points that the indirect connection no. 7 contributes to the connectedness.

In reverse embodiments, a user may input Name2 as the first individual and Name1 as the second individual. The apparatus may determine a different connectedness if Name2 is input as the first individual and Name1 is input as the second individual. This is because although 1) there are eight connections from Name2 (first individual) to Name1 (second individual), and 2) and the type of each connection is the same as the original embodiments where Name1 is the first individual and 'Name2' is the second individual, the tree network between Name2 and Name1 is asymmetrical about a vertical axis between Name1 and Name2, and the branching of each indirect connection in the reverse embodiments is different from the branching of each indirect connection in the original embodiments. For instance, in the reverse embodiments, the apparatus initially determines eight different connection segments from Name2, namely, connection segments via Name11, Name17, Name6, Name16, Name7, Name4, Name10, and Name14. In the original embodiments, the apparatus initially determines only two potential connection segments from Name1, namely, connection segments via Name3 and Name4. Therefore, for this reason, the determined connectedness associated with the reverse embodiments may be greater than the determined connectedness associated with the original embodiments.

Therefore, at times, the apparatus may be configured to determine that the number of initial connection segments (reverse embodiments: 8 segments, original embodiments: 2 segments) has a greater contribution to the connectedness than the number of final connection segments (reverse embodiments: 2 segments, original embodiments: 8 segments). As used herein, an initial connection segment is a connection segment from the first individual (also known as origin individual) to the first intermediate individual on an indirect connection. As used herein, a final connection segment is a connection segment from the final intermediate individual on the indirect connection to the second individual (also known as destination individual).

However, at other times, the apparatus may be configured to determine that the number of initial connection segments (reverse embodiments: 8 segments, original embodiments: 2 segments) has a smaller contribution to the connectedness when compared to the number of final connection segments (reverse embodiments: 2 segments, original embodiments: 8 segments). When the apparatus is configured in such a manner, the determined connectedness associated with the reverse embodiments may be smaller than the determined connectedness associated with the original embodiments.

In embodiments where the apparatus determines the connectedness based on only the number of indirect connections between two individuals and the type of each indirect connection, the apparatus may determine the same connectedness, regardless of whether Name1 or Name2 is input as the first individual and the remaining individual is input as the second individual. In such embodiments, in determining the connectedness, the apparatus may not consider the branching of each indirect connection and may give equal weightage to the contribution of a connection segment on the determined connectedness, regardless of whether the connection segment is closer to the first individual or closer to the second individual. For example, the apparatus may be configured to determine that the number of initial connection segments (8 segments) in the reverse embodiments (where Name2 is the first individual and Name1 is the second individual) has a contribution to the connectedness that is equal to the contribution to the connectedness of the number of final connection segments (8 segments) in the original embodiments (where Name2 is the first individual and Name1 is the second individual).

In some embodiments, if the user inputs the number '4' in text field 448 of FIG. 4, the apparatus ignores indirect connection no. 8 when determining the connectedness. This is because indirect connection no. 8 has five intermediate individuals, while the user instructed the CCW application to ignore connections that have more than four intermediate individuals.

In some embodiments, the qualitative value of an indirect connection is an additional factor that is used to determine the connectedness value of an indirect connection at block 140 of FIG. 1. This qualitative value is based on qualitative information associated with the first individual and the second individual gleaned (or received/pulled) from one or more social networks or from other public information. For example, the qualitative value is based at least partially on the first individual's activity on one or more social networks, the second individual's activity on one or more social networks, and the first individual's communication (e.g., via social network exchangeables) with the second individual on one or more social networks. In some embodiments, only the qualitative value of an indirect connection may be used to determine the connectedness associated with either a direct connection or an indirect connection. In such embodiments, the qualitative connectedness becomes pure qualitative connectedness. As explained in further detail below, the qualitative value of an indirect connection may be computed to be either a positive value, a negative value, or a neutral value.

An individual's activity on a social network may include one or more elements of information associated with the individual's social network account. For example, the elements of information may include membership in groups, interests listed on the individual's account, links to articles (e.g., news articles) or multimedia posted on the individual's account, applications used by the individual's account, photographs/video in which the individual appears and/or shares with others on the social network, messages sent to and received from a second individual via the social network, etc. The list of information elements that can be gleaned from an individual's social network account is not limited to those discussed here.

Therefore, in order to determine the qualitative value associated with an indirect connection between a first individual and a second individual, an apparatus pulls the first individual's activity on a social network (see above elements of information). In some embodiments, the apparatus pulls the first individual's activity that occurred within a pre-determined period of time (e.g., previous one year). This may be because activity that occurred more than one year ago may be less important in assessing the quality of a connection. Additionally, by setting a predetermined period, a server that pulls information can do so efficiently without over-consuming computing resources and time. Next, the apparatus pulls the second individual's activity that occurred within the same pre-determined period of time. Next, the apparatus looks for exchangeables exchanged between the first individual and the second individual within the same pre-determined period of time.

If the apparatus determines a frequent (greater than a threshold frequency) exchange of social network exchangeables (e.g., links, multimedia, photos, applications, etc.) between the first individual and the second individual, the apparatus may assign a positive value to the connection between the first individual and the second individual. If the apparatus determines normal exchangeable flow (at or near threshold frequency) between the first individual and the second individual, the apparatus may assign a neutral value to the connection between the first individual and the second individual. If the apparatus determines less than normal (less than a threshold frequency) exchangeable flow between the first individual and the second individual, the apparatus may assign a negative value to the connection between the first individual and the second individual. Therefore, the qualitative value is based on exchangeable social network information between the first individual and the second individual. Each type of exchanged information is associated with a distinct value (positive, or negative, or neutral) that contributes to the overall qualitative value of the connection. As used herein, the threshold frequency may be predetermined by the user or dynamically determined by the apparatus.

In some embodiments, the qualitative value of the indirect connection between the first individual and the second individual may also be based on social network information that the two individuals commonly share. This type of information may also be referred as unexchanged information. For example, both individuals may be part of the same groups (or both attended the same school), or list the same interests (e.g., fans of the same team), or use the same applications; however, the individuals have never exchanged this information and are unaware of the commonality of information between them. As another instance, if both individuals are tagged in the same picture, this information may also comprise unexchanged information if the picture is not exchanged between the two individuals. Each type of unexchanged information is associated with a distinct value (positive, or negative, or neutral) that contributes to the overall qualitative value of the connection.

If the apparatus determines an amount of commonly shared information that is greater than a threshold value (where the threshold value is predetermined by the user or dynamically determined by the apparatus), the apparatus may assign a positive value to the connection between the first individual and the second individual. If the apparatus determines a normal amount (e.g., at or near the threshold value) of commonly shared information, the apparatus may assign a neutral value to the connection between the first individual and the second individual. If the apparatus determines an amount of commonly shared information that is less than a threshold value, the apparatus may assign a negative value to the connection.

In some embodiments, the qualitative value of a connection may also be generated for direct connections between individuals. Therefore, the above steps of assessing the quality of a connection for an indirect connection may also apply to direct connections between two individuals.

Referring now to FIG. 2, a system 300 is presented for determining the connectedness from a first individual to a second individual, in accordance with embodiments of the present invention. As illustrated, the system 300 includes a network 310, a management system 330, and a user interface system 340. FIG. 2 also illustrates a social network account 331, which is operatively connected (e.g., linked) to the management system 330.

As shown in FIG. 2, the management system 330, and the user interface system 340 are each operatively and selectively connected to the network 310, which may include one or more separate networks. In addition, the network 310 may include a local area network (LAN), a wide area network (WAN), and/or a global area network (GAN), such as the Internet. It will also be understood that the network 310 may be secure and/or unsecure and may also include wireless and/or wireline and/or optical interconnection technology.

The user interface system 340 may include any computerized apparatus that can be configured to perform any one or more of the functions of the user interface system 340 described and/or contemplated herein. In some embodiments, for example, the user interface system 340 may include a personal computer system, a mobile computing device, a personal digital assistant, a public kiosk, a network device, and/or the like. As illustrated in FIG. 2, in accordance with some embodiments of the present invention, the user interface system 340 includes a communication interface 342, a processor 344, a memory 346 having a CCW application 347 stored therein, and a user interface 349. In such embodiments, the communication interface 342 is operatively and selectively connected to the processor 344, which is operatively and selectively connected to the user interface 349 and the memory 346.

Each communication interface described herein, including the communication interface 342, generally includes hardware, and, in some instances, software, that enables a portion of the system 300, such as the user interface system 340, to transport, send, receive, and/or otherwise communicate information to and/or from the communication interface of one or more other portions of the system 300. For example, the communication interface 342 of the user interface system 340 may include a modem, server, electrical connection, and/or other electronic device that operatively connects the user interface system 340 to another electronic device, such as the electronic devices that make up the management system 330.

Each processor described herein, including the processor 344, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the CCW application 347 of the memory 346 of the user interface system 340.

Each memory device described herein, including the memory 346 for storing the CCW application 347 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 346 includes the CCW application 347. In some embodiments, the CCW application 347 includes an interface for communicating with, navigating, controlling, configuring, and/or using the management system 330 and/or other portions of the system 300. For instance, the CCW application allows a user to input or search for the names of a social network, a first individual, and a second individual (see example user interface in FIG. 4). In some embodiments, the CCW application 347 includes computer-executable program code portions for instructing the processor 344 to perform one or more of the functions of the CCW application 347 described and/or contemplated herein. In some embodiments, the CCW application 347 may include and/or use one or more network and/or system communication protocols.

Also shown in FIG. 2 is the user interface 349. In some embodiments, the user interface 349 includes one or more user output devices, such as a display and/or speaker, for presenting information to the user 345 and/or some other user. In some embodiments, the user interface 349 includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 345 and/or some other user. In some embodiments, the user interface 349 includes the input and display devices of a personal computer, such as a keyboard and monitor, that are operable to receive and display information associated with the account.

FIG. 2 also illustrates a management system 330, in accordance with an embodiment of the present invention. The management system 330 may include any computerized apparatus that can be configured to perform any one or more of the functions of the management system 330 described and/or contemplated herein. In accordance with some embodiments, for example, the management system 330 may include a computer network, an engine, a platform, a server, a database system, a front end system, a back end system, a personal computer system, and/or the like. In some embodiments, such as the one illustrated in FIG. 2, the management system 330 includes a communication interface 332, a processor 334, and a memory 336, which includes a CCW application 337 and a datastore 338 stored therein. As shown, the communication interface 332 is operatively and selectively connected to the processor 334, which is operatively and selectively connected to the memory 336.

It will be understood that the CCW application 337 may be configured to implement any one or more portions of any one or more of the process flow 100 described and/or contemplated herein. It will also be understood that, in some embodiments, the CCW application 337 is configured to communicate with the datastore 338, and/or any one or more other portions of the system 300. As an example, in some embodiments, the CCW application 337 is configured to receive information associated with the social network, determine a direct connection between the first individual and the second individual, and in response to determining no direct connection: 1) determine one or more indirect connections between a first individual and a second individual, and 2) determine the connectedness based at least partially on: the number of indirect connections between the first individual and the second individual, and/or the type of each indirect connection, and/or the qualitative value of each indirect connection. In some embodiments, the CCW application is further configured to recognize an indirect connection as a path between the first individual and the second individual, where the path includes one or more intermediate individuals. In some embodiments, the CCW application is further configured to identify the type of an indirect connection based at least partially on the number of intermediate individuals associated with (or situated on) the indirect connection. In some embodiments, the CCW application is further configured to compute the contribution of an indirect connection to the connectedness based at least partially on the number of branch connections associated with the indirect connection and the type of each branch connection, where the type of each branch connection is based at least partially on a distance of the branch connection to the first individual. In some embodiments, the CCW application is further configured to compute the qualitative value of each indirect connection based on information gleaned (or received/pulled) from one or more social networks.

In some embodiments, the CCW application is further configured to in response to determining a direct connection: 1) determine one or more indirect connections between a first individual and a second individual, and 2) determine the connectedness based at least partially on: the direct connection, the number of indirect connections between the first individual and the second individual, and/or the type of each indirect connection, and/or the qualitative value of each indirect connection.

In some embodiments, the CCW application is further configured to prompt a user to input, on a user interface, a name of the social network, a name of the first individual, and a name of the second individual. In some embodiments, the CCW application is further configured to prompt a user to input, on a user interface, a numeric value for a maximum number of intermediate individuals, where, in determining the connectedness, the application ignores an indirect connection that includes more than the maximum number of intermediate individuals. In other embodiments, the CCW application sets a predetermined 'maximum number of intermediate individuals' value. The CCW application may prompt the user to either modify this value or use this value unchanged.

It will be further understood that, in some embodiments, the CCW application 337 includes computer-executable program code portions for instructing the processor 334 to perform any one or more of the functions of the CCW application 337 described and/or contemplated herein. In some embodiments, the CCW application 337 may include and/or use one or more network and/or system communication protocols. It will also be understood that, in some embodiments, the memory includes other applications.

In addition to the CCW application 337, the memory 336 also includes the datastore 338. As used herein, the datastore 338 may be one or more distinct and/or remote datastores. In some embodiments, the datastore 338 is not located within the management system and is instead located remotely from the management system. In some embodiments, the datastore 338 stores information regarding various social networks and various social network accounts (e.g., account information associated with the first and second individuals).

It will be understood that the datastore 338 may include any one or more storage devices, including, but not limited to, datastores, databases, and/or any of the other storage devices typically associated with a computer system. It will also be understood that the datastore 338 may store information in any known way, such as, for example, by using one or more computer codes and/or languages, alphanumeric character strings, data sets, figures, tables, charts, links, documents, and/or the like. Further, in some embodiments, the datastore 338 may include information associated with one or more applications, such as, for example, the CCW application 337. It will also be understood that, in some embodiments, the datastore 338 provides a substantially real-time representation of the information stored therein, so that, for example, when the processor 334 accesses the datastore 338, the information stored therein is current or substantially current.

It will be understood that the embodiment illustrated in FIG. 2 is exemplary and that other embodiments may vary. As another example, in some embodiments, the management system 330 includes more, less, or different components, such as, for example, an account manager user interface. As another example, in some embodiments, some or all of the portions of the system 300 may be combined into a single portion. Specifically, in some embodiments, the user interface system 340 and the management system 330 are combined into a single user interface and management system configured to perform all of the same functions of those separate portions as described and/or contemplated herein. Likewise, in some embodiments, some or all of the portions of the system 300 may be separated into two or more distinct portions.

In addition, the various portions of the system 300 may be maintained for by the same or separate parties. For example, as previously mentioned, a single entity may maintain the account 331 and the management system 330. However, in other embodiments, the account 331 and the management system 330 may each be maintained by separate entities.

It will also be understood that the system 300 may include and/or implement any embodiment of the present invention described and/or contemplated herein. For example, in some embodiments, the system 300 is configured to implement any one or more of the embodiments of the process flow 100 described and/or contemplated herein in connection with FIG. 1.

FIGS. 3-6 illustrate example screenshots of a CCW application user interface. The screenshots discussed below with respect to various process blocks are mere examples of screenshots in some embodiments of the invention. In other embodiments of the invention, the screenshots may include additional features not described herein, or may not include each and every feature described herein. As used with respect to the various screenshots of FIGS. 3-6, an "apparatus" may be the management system 330 or the user interface system 340 depicted in FIG. 2. The apparatus may generate, or initiate generation of, the screenshots presented in FIGS. 3-6 and may cause the presentation of one or more elements in each screenshot presented in FIGS. 3-6.

FIG. 3 presents an example screenshot of a page 300 that is presented to a user when the user executes an action (e.g., click or touch) that initiates the CCW application on the user interface. In order to view the page 300, the personnel may need to authenticate himself/herself to the CCW application. In some embodiments, a user may enter a name of a social network in the text field 442 associated with the 'Choose Social Network' prompt. In some embodiments, the application prompts a user to select a 'Choose' option 452. An "option," as used herein, may be a digital button, icon, menu, etc. If the user selects the 'Choose' option, the application may present in a pop-window or panel a list of social networks that are associated with the CCW application.

In some embodiments, a user may enter a name of a first individual in the text field 444 associated with the 'Name of First Individual' prompt. In some embodiments, the application prompts a user to select a 'Search' option 454. If the user enters a name (e.g., Name1) in the text field, and subsequently selects the 'Search' option, the application may present in a pop-window or panel a list of individuals that have accounts associated with a name that matches 'Name1' to a predetermined degree of confidence. The user may subsequently select a particular first individual from the displayed list of individuals. In some embodiments, a user may enter a name of a second individual in the text field 446 associated with the 'Name of Second Individual' prompt. In some embodiments, the application prompts a user to select a 'Search' option 456. If the user enters a name (e.g., Name2) in the text field, and subsequently selects the 'Search' option, the application may present in a pop-window or panel a list of individuals associated with a name that matches 'Name2' to a predetermined degree of confidence. The user may subsequently select a particular second individual from the displayed list of individuals. In some embodiments, the application may display an error message if the user selects the same individual for the first individual text field and the second individual text field.

In some embodiments, the application prompts a user to enter a numeric value in text field 448 (or select a numeric value from a list of numeric values, where the list of numeric values is presented when the selects the 'Choose' option 458). This numeric value allows a user to define the length of indirect connections that can be ignored by the application in computing the connectedness between the first individual and the second individual. In some embodiments, if the user does not enter a value in text field 448, the application uses a predetermined number (e.g., 5). The smaller the numeric value selected by the user in text field 448, the faster that the application can produce a result. Moreover, the smaller the numeric value input into the text field 448, the less computing resources the apparatus may have to use in producing a result. In some embodiments, the application prompts a user to select an option to include the qualitative (or quality) value (based on qualitative information) of the connection in determining the connectedness. The application also provides a digital button to execute the CCW application and determine the connectedness based on the user input provided at 442, 444, 446, 448, and input provided regarding whether the qualitative value of the connection should be included in the computation of the connectedness.

FIG. 4 presents an example screenshot of a results page 400 that is presented to a user when the user selects the option 460 in FIG. 3. FIG. 4 presents the connectedness rating 406 as determined by the application. FIG. 4 also presents the connectedness color 404 associated with the connectedness rating. In some embodiments, a connectedness rating of 0 is associated with a white color graph, while a connectedness rating of 10 is associated with a black color graph. Therefore, since the determined threat rating is 7.55, the connectedness color graph is a darker shade of grey rather than a lighter shade of grey. The application also presents to the user an option 408 to learn more about the connectedness rating. When the user selects the option 408, the application presents the image 410 to the user. The image 410 presents the connections between the first individual and the second individual based on the user input in FIG. 3. For instance, since the user entered '5' in text field 448 of FIG. 3, the application, in image 410, does not present connections that have more than five intermediate individuals. As seen in image 410, the longest connection considered by the application in determining the connectedness has five intermediate individuals (connection no. 8). The significance of the various connections in contributing to the connectedness has been described earlier with respect to block 140 of FIG. 1. In some embodiments, the connectedness rating may be based on the quality of the indirect connection as well. As explained previously, the apparatus may prompt a user to select an option to consider the qualitative information associated with the two individuals when executing the application to compute the connectedness between the two individuals.

In some embodiments, the application may further present, on the user interface, a descriptor for the determined connectedness. For instance, the application may present a descriptor of "Very Connected" if the determined connectedness is between 7 and 10 (where 10 is the maximum value that the connectedness can take). As a further instance, the application may present a description of "Moderately Connected" if the determined connectedness is between 3 and 7. As a further instance, the application may present a description of "Unconnected" if the determined connectedness is between 0 and 3 (where 0 is the minimum value that the connectedness can take).

FIG. 5 presents an alternate embodiment of the user input page presented in FIG. 3. In the example screenshot 500 presented in FIG. 5, the application prompts the user to input a name of a social network and a name of a first individual. Therefore, in some embodiments, a user may enter a name of a social network (or a plurality of social networks) in the text field 442 associated with the 'Choose Social Network' prompt. In some embodiments, the application prompts a user to select a 'Choose' option 452. An "option," as used herein, may be a digital button, icon, menu, etc. If the user selects the 'Choose' option, the application may present in a pop-window or panel a list of social networks that are associated with the CCW application (i.e., a list of social networks from which the CCW application may pull or receive information). In some embodiments (as presented in FIG. 5), a user may choose a plurality of social networks, e.g., Social Networks A, B, C, D, and E. Furthermore, a user may enter a name of a first individual in the text field 444 associated with the 'Name of First Individual' prompt. In some embodiments, the application prompts a user to select a 'Search' option 454. If the user inputs a name (e.g., Name1) in the text field, and subsequently selects the 'Search' option, the application may search the chosen social networks (e.g., social networks A, B, C, D, and E) for an account with a name that matches 'Name1' to a predetermined degree of confidence. The application may present this list of individuals in a pop-up window or panel. The user may subsequently select a particular first individual (associated with a particular social network) from the displayed list of individuals. Alternatively, the user may select multiple displayed individuals (associated with a plurality of social networks) from the displayed list of individuals. For instance, as presented in FIG. 5, the user may select Name1 (associated with Social Network A), Name1 (associated with Social Network B), Name1 (associated with Social Network C), Name1 (associated with Social Network D), and Name1 (associated with Social Network E).

Additionally, the application prompts the user to input, at text field 468, a connectedness value between 1 and 10, both inclusive. Alternatively, the user may select the 'Choose' option 469 which presents to the user the range of values that the 'Connectedness Value' may take. When the user selects an option to execute the application (e.g., digital button 470) based at least partially on the user input, the application receives social network information (information regarding direct and indirect connections) associated with the first individual. Assume that the user enters a connectedness value of 6.31. In some embodiments, the application may prompt the user to enter a qualitative value for the connection (e.g., +5, −6, 0, etc.). The application may present the user with the maximum and minimum values that the qualitative value can take. When a user enters a qualitative value, the application pulls qualitative social network information associated with the individual/individuals as explained previously.

The application analyzes the social network information (associated with the chosen social networks) and determines a list (or set) of individuals that are connected to the first individual (both direct and indirect connections), where the connectedness from the first individual to each individual on the list of individuals is less than or equal to the user-inputted connectedness value. The application subsequently initiates presentation of this list of individuals on a results page 600. In some embodiments, the application orders the list in descending order of connectedness, from an individual associated with the highest connectedness value to an individual associated with the lowest connectedness value (i.e., greater than or equal to the user-inputted connectedness value). In some embodiments, the application may present the connectedness value and the social network associated with a displayed individual. In some embodiments, the application may present an option (482, 484, and 486) to the user, where the option allows a user to change the order in which the displayed individuals are presented (e.g., change to ascending order of connectedness, change to ordering by name of individual, change to ordering by name of social network, etc.). An example screenshot of a results page is depicted in FIG. 6.

In still other alternate embodiments, the application prompts the user to input a name of a first individual and a connectedness value, but does not prompt the user to enter a name of a social network. Therefore, a user may enter a name of a first individual in the text field 444 associated with the 'Name of First Individual' prompt. In some embodiments, the application prompts a user to select a 'Search' option 454. If the user enters a name (e.g., Name1) in the text field, and subsequently selects the 'Search' option, the application scans one or more social networks from which the application may receive or pull information to determine any social network accounts associated with a name that matches 'Name1' to a predetermined degree of confidence. The application may subsequently initiate presentation of a list of accounts from one or more social networks, where the accounts are associated with a name that matches 'Name1' to a predetermined degree of confidence. The user may subsequently select a particular first individual from the displayed list of individuals. In some embodiments, the application allows a user to select more than one individual from the displayed list of individuals. For instance, the user may select a first individual's account on Social Network A, and the user may also select the same first individual's account on Social Network B. In other embodiments, the user may select a first individual's account on Social Network A, and the user may also select a different individual's account on Social Network B (or A). Additionally, the application prompts the user to input, at text field 468, a connectedness value between 1 and 10, both inclusive.

Assume an embodiment where the user selects a first individual's account on Social Network A, and where the user also selects the same first individual's account on Social Network B. When the user selects an option to execute the application (e.g., digital button 470) based at least partially on the user input, the application receives social network information (information regarding direct and indirect connections from both Social Network A and Social Network B) associated with the first individual. The application analyzes the social network information associated with both social networks and determines a list (or set) of individuals that are connected to the first individual (both direct and indirect connections), where the connectedness from the first individual to each individual on the list of individuals is less than or equal to the user-inputted connectedness value. The application subsequently initiates presentation of this list of individuals. In some embodiments, the application orders the list in descending order of connectedness, from an individual associated with the highest connectedness value to an individual associated with the lowest connectedness value (i.e., where the lowest connectedness value is greater than or equal to the user-inputted connectedness value). In some embodiments, the application may present the connectedness value associated with a displayed individual. In some embodiments, the application may also present the name of the social network associated with the displayed individual (e.g., Social Network A or Social Network B). In some embodiments, the application may present an option (482, 484, and 486) to the user, where the option allows a user to change the order in which the displayed individuals are presented (e.g., change to descending order, change to ordering by name of individual, change to ordering by name of social network, etc.).

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method to determine connectedness from a first individual to a second individual on a social network, the method comprising:

receiving information associated with the social network of a first individual;

determining, based at least partially on the received information, using a processor, a direct connection between the first individual and the second individual;

calculating a connection path length between the first individual and the second individual on a social network based at least partially on the received social network information associated with the first individual;

comparing the calculated connection path length to a predetermined connection path length threshold value;

determining the calculated connection path length is greater than the predetermined connection path length threshold value;

determining an indirect connection between the first individual and the second individual based on at least determining that the connection path length is greater than the predetermined connection path length threshold value, wherein the indirect connection comprises one or more intermediate individuals;

calculating a cumulative connectedness weight (CCW) factor based on at least partially on the received network information and the calculated path length;

comparing the calculated CCW factor to a dynamic predetermined CCW threshold value, wherein the dynamic predetermined CCW threshold value is calculated based at least partially on determining at least a predetermined number of interactions between the first individual and the second individual during a predetermined period of time;

determining that the calculated CCW factor is greater than the dynamic predetermined CCW threshold value;

confirming the indirect connection between the first individual and the second individual based on determining that the calculated CCW factor is lower than the dynamic predetermined CCW threshold value; and in response to determining no direct connection:
determining, based at least partially on the received information, one or more indirect connections between the first individual and the second individual;
determining an exchange of social network exchangeables between the first individual and the second individual, the social network exchangeables comprising multimedia;
determining unexchanged information common to the first individual and the second individual, the unexchanged information not exchanged between the first individual and the second individual, the unexchanged information comprising a picture tagging both the first individual and the second individual;
determining the connectedness based at least partially on: a number of indirect connections between the first individual and the second individual, a type of each indirect connection, the unexchanged information, and the exchange of social network exchangeables.

2. The method of claim 1, wherein the type of the indirect connection is based at least partially on a number of intermediate individuals associated with the indirect connection.

3. The method of claim 2, further comprising:
in response to determining a direct connection:
determining one or more indirect connections between the first individual and the second individual; and
determining the connectedness based at least partially on: the direct connection, the number of indirect connections between the first individual and the second individual, and the type of each indirect connection.

4. The method of claim 1, wherein a contribution of an indirect connection to the connectedness is based at least partially on a number of branch connections associated with the indirect connection and a type of each branch connection, wherein the type of each branch connection is based at least partially on a distance of the branch connection to the first individual.

5. The method of claim 1, further comprising:
prompting a user to input, on a user interface, a name of the social network, a name of the first individual, and a name of the second individual.

6. The method of claim 1, further comprising:
prompting a user to input, on a user interface, a numeric value for a maximum number of intermediate individuals, wherein, in determining the connectedness, an indirect connection that comprises more than the maximum number of intermediate individuals is ignored.

7. The method of claim 1, wherein the determined connectedness from the first individual to the second individual is the same as a determined connectedness from the second individual to the first individual.

8. The method of claim 1, wherein the determined connectedness from the first individual to the second individual is different from a determined connectedness from the second individual to the first individual.

9. The method of claim 1, further comprising:
determining the connectedness based at least partially on a qualitative value associated with the indirect connection, wherein the qualitative value is based at least partially on the first individual's activity on the social network, the second individual's activity on the social network, and the first individual's communication with the second individual on the social network.

10. The method of claim 9, wherein the qualitative value is either a positive or a negative value.

11. An apparatus to determine connectedness from a first individual to a second individual on a social network, the apparatus comprising:
a memory;
at least processor; and
a module stored in the memory, wherein said module comprising computer instruction code executable by the at least one processor, and structured to cause said at least one processor to:
receive information associated with the social network of a first individual;
determine, based at least partially on the received information, using a processor, a direct connection between the first individual and the second individual;
calculate a connection path length between the first individual and the second individual on a social network based at least partially on the received social network information associated with the first individual;
compare the calculated connection path length to a predetermined connection path length threshold value;
determine the calculated connection path length is greater than the predetermined connection path length threshold value;
determine an indirect connection between the first individual and the second individual based on at least determining that the connection path length is greater than the predetermined connection path length threshold value, wherein the indirect connection comprises one or more intermediate individuals;
calculate a cumulative connectedness weight (CCW) factor based on at least partially on the received network information and the calculated path length;
compare the calculated CCW factor to a dynamic predetermined CCW threshold value, wherein the dynamic predetermined CCW threshold value is calculated based at least partially on determining at least a predetermined number of interactions between the first individual and the second individual during a predetermined period of time;
determine that the calculated CCW factor is greater than the dynamic predetermined CCW threshold value; and
confirm the indirect connection between the first individual and the second individual based on determining that the calculated CCW factor is lower than the dynamic predetermined CCW threshold value;
in response to determining no direct connection:
determine, based at least partially on the received information, one or more indirect connections between the first individual and the second individual;
determine an exchange of social network exchangeables between the first individual and the second individual, the social network exchangeables comprising multimedia;
determine unexchanged information common to the first individual and the second individual, the unexchanged information not exchanged between the first individual and the second individual, the unexchanged information comprising a picture tagging both the first individual and the second;
determine the connectedness based at least partially on: a number of indirect connections between the first individual and the second individual, a type of each indirect connection, the unexchanged information, and the exchange of social network exchangeables.

12. The apparatus of claim 11, wherein the type of the indirect connection is based at least partially on a number of intermediate individuals associated with the indirect connection.

13. The apparatus of claim 12, wherein the module is further configured to:
in response to determining a direct connection:
determine one or more indirect connections between the first individual and the second individual; and
determine the connectedness based at least partially on:
the direct connection, the number of indirect connections between the first individual and the second individual, and the type of each indirect connection.

14. The apparatus of claim 11, wherein a contribution of an indirect connection to the connectedness is based at least partially on a number of branch connections associated with the indirect connection and a type of each branch connection, wherein the type of each branch connection is based at least partially on a distance of the branch connection to the first individual.

15. The apparatus of claim 11, wherein the module is further configured to:
prompt a user to input, on a user interface, a name of the social network, a name of the first individual, and a name of the second individual.

16. The apparatus of claim 11, wherein the module is further configured to:
prompt a user to input, on a user interface, a numeric value for a maximum number of intermediate individuals, wherein, in determining the connectedness, the module ignores an indirect connection that comprises more than the maximum number of intermediate individuals.

17. The apparatus of claim 11, wherein the connectedness is determined based at least partially on a qualitative value associated with the indirect connection, wherein the qualitative value is based at least partially on the first individual's activity on the social network, the second individual's activity on the social network, and the first individual's communication with the second individual on the social network.

18. The apparatus of claim 17, wherein the qualitative value is either a positive or a negative value.

19. A computer program product to determine connectedness between from a first individual to a second individual on a social network, the computer program product comprising:
a non-transitory computer-readable medium comprising a set of codes for causing a computer to:
receive information associated with the social network of a first individual;
determine, based at least partially on the received information, using a processor, a direct connection between the first individual and the second individual;
calculate a connection path length between the first individual and the second individual on a social network based at least partially on the received social network information associated with the first individual;
compare the calculated connection path length to a predetermined connection path length threshold value;
determine the calculated connection path length is greater than the predetermined connection path length threshold value;
determine an indirect connection between the first individual and the second individual based on at least determining that the connection path length is greater than the predetermined connection path length threshold value, wherein the indirect connection comprises one or more intermediate individuals;
calculate a cumulative connectedness weight (CCW) factor based on at least partially on the received network information and the calculated path length;
compare the calculated CCW factor to a dynamic predetermined CCW threshold value, wherein the dynamic predetermined CCW threshold value is calculated based at least partially on determining at least a predetermined number of interactions between the first individual and the second individual during a predetermined period of time;
determine that the calculated CCW factor is greater than the dynamic predetermined CCW threshold value; and
confirm the indirect connection between the first individual and the second individual based on determining that the calculated CCW factor is lower than the dynamic predetermined CCW threshold value;
in response to determining no direct connection:
determine, based at least partially on the received information, one or more indirect connections between the first individual and the second individual;
determine an exchange of social network exchangeables between the first individual and the second individual, the social network exchangeables comprising multimedia;
determine unexchanged information common to the first individual and the second individual, the unexchanged information not exchanged between the first individual and the second individual, the unexchanged information comprising a picture tagging both the first individual and the second;
determine the connectedness based at least partially on:
a number of indirect connections between the first individual and the second individual, a type of each indirect connection, the unexchanged information, and the exchange of social network exchangeables.

20. The computer program product of claim 19, wherein the type of the indirect connection is based at least partially on a number of intermediate individuals associated with the indirect connection.

21. The computer program product of claim 20, wherein the set of codes further causes a computer to:
in response to determining a direct connection:
determine one or more indirect connections between the first individual and the second individual; and
determine the connectedness based at least partially on:
the direct connection, the number of indirect connections between the first individual and the second individual, and the type of each indirect connection.

22. The computer program product of claim 19, wherein a contribution of an indirect connection to the connectedness is based at least partially on a number of branch connections associated with the indirect connection and a type of each branch connection, wherein the type of each branch connection is based at least partially on a distance of the branch connection to the first individual.

23. The computer program product of claim 19, wherein the set of codes further causes a computer to:
prompt a user to input, on a user interface, a name of the social network, a name of the first individual, and a name of the second individual.

24. The computer program product of claim 19, wherein the set of codes further causes a computer to:
prompt a user to input, on a user interface, a numeric value for a maximum number of intermediate individuals, wherein, in determining the connectedness, the set of codes ignores an indirect connection that comprises more than the maximum number of intermediate individuals.

25. The computer program product of claim 19, wherein the determined connectedness from the first individual to the second individual is different from a determined connectedness from the second individual to the first individual.

26. The computer program product of claim 19, wherein the connectedness is determined based at least partially on a qualitative value associated with the indirect connection, wherein the qualitative value is based at least partially on the first individual's activity on the social network, the second individual's activity on the social network, and the first individual's communication with the second individual on the social network.

27. The computer program product of claim 26, wherein the qualitative value is either a positive or a negative value.

* * * * *